July 26, 1932.  F. C. MILLS  1,868,714
TRAP SETTING DEVICE
Filed Feb. 10, 1931

Inventor
F. C. Mills
By Watson E. Coleman
Attorney

Patented July 26, 1932

1,868,714

UNITED STATES PATENT OFFICE

FRANK C. MILLS, OF LAPLANT, SOUTH DAKOTA

TRAP SETTING DEVICE

Application filed February 10, 1931. Serial No. 514,820.

This invention relates to a trap setting device, and primarily it is an object of the invention to provide a device of this kind especially designed and adapted for use in connection with a jaw trap wherein the jaws are maintained in opened or set position through the instrumentality of a rocking trigger, and which setting device, when in applied or working position with respect to the trigger, provides effective means to prevent dirt, stones and other material in any way interfering with the desired release movement of the trigger.

Another object of the invention is to provide a trap setting device of this kind which is adapted to be positioned below the trigger to provide effective means to hold the trigger against release under the weight of birds or of animals smaller than the particular specie of animal it is desired to capture, and which also operates to hold the trigger in set or working position particularly during that period when the trap is being placed as desired by the trapper.

In connection with the trapping of certain specie of animals it is important that the trap in its entirety be concealed as much as possible and this concealment is generally obtained by covering the trap with dirt. A further object of the invention is to provide a trap setting device for coaction with the trigger to hold the trap against accidental release under the weight of such covering of dirt or other materials.

The invention consists in the details of construction and in the combination and arrangement of the several parts of my improved trap setting device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1:
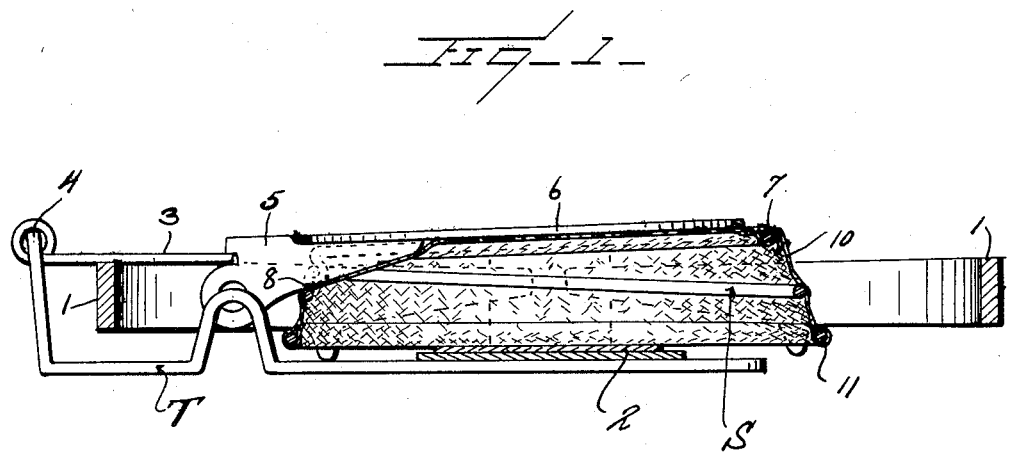
Figure 1 is a view partly in section and partly in side elevation illustrating a trap setting device constructed in accordance with an embodiment of my invention and in applied position.

As disclosed in the accompanying drawing, T denotes a conventional form of trap including the coacting jaws 1 which are forcibly brought together in a well known fashion by an associated spring 2. The jaws 1 are maintained in their separated or open position through the medium of a latch bar 3 pivotally or hingedly connected, as at 4, to a desired part of the trap and which latch bar is engaged over one of the jaws 1 and maintained in effective or working position by proper interlocking with a trigger 5. The trigger 5 carries a pan 6 which is positioned substantially centrally of the jaws 1 when in their opened position.

The foregoing parts or features form no part of the present invention as they are comprised in a trap of a well known construction and which is generally in use by trappers of fur bearing animals.

Figure 2:
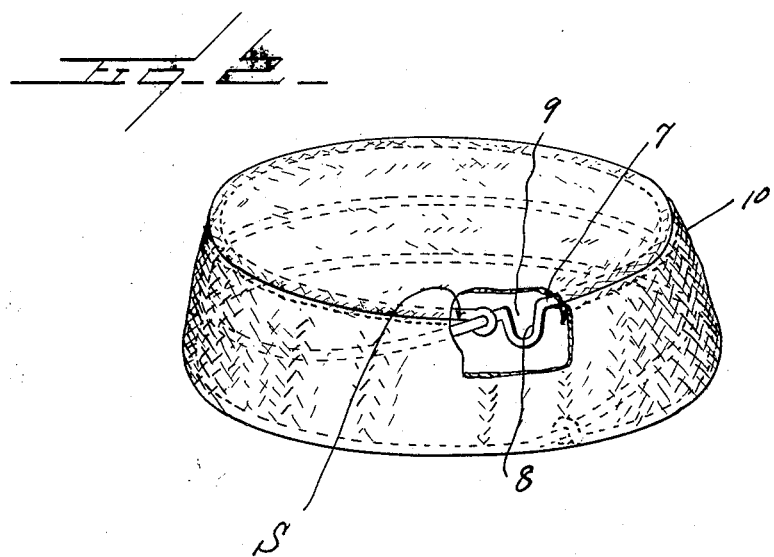
Figure 2 is a view in perspective with a portion broken away of the trap setting device as illustrated in Figure 1.

My trap setting device is particularly illustrated in Figure 2 of the accompanying drawing and, as herein disclosed, my device comprises a coiled spring S preferably of a spiral type so that the same will be capable of maximum compression. The upper convolution or fake 7 of the spring at a desired point thereon is downwardly crimped, as at 8, to provide a recess or notch 9 for a purpose to be hereinafter more particularly referred to. The spring S is placed under tension or compression within a hood or casing 10 of any desired flexible or readily yielding material. This hood or casing 10 is in the form of an inverted cup and has its free marginal portion suitably anchored or secured to the lower convolution or fake 11 of the spring S. I also find it preferable and desirable to secure the marginal portion of the head or top of the hood or casing 10 to the upper or top convolution or fake 7 of the spring. As herein disclosed, the attachments with the end convolutions or fakes of the spring S are effected by stitching although such connections may be made in any fashion which fully complies with the requirements and necessities of practice.

In the production of my trap setting device, it is to be stated that in all instances the tension of the spring S is not the same as this will be dependent upon the size and character of the trap and more particularly the specie of animals it is desired to capture. In other words, in certain instances the tension of the spring S will be relatively light whereas in other instances it will be materially greater.

After the trap T has been properly set my device is placed below and in close contact with the pan 6, the device then being also rested upon the base or kindred portion of the trap T. In the present instance the device as illustrated in Figure 1 is shown upon the central portion of the spring 2 but insofar as my present invention is concerned it is to be understood that this spring 2 comes within the general term or definition of base.

With my device in applied position as illustrated in Figure 1, and with the trap covered with earth or kindred material for the purpose of concealment, it will be readily understood that the tension of the device as afforded by the spring S will prevent the weight of such materials from depressing the trigger 5 and releasing the jaws 1. The tension of the spring S, or of the device itself, is also such to hold the trigger 5 against depression or release movement under the weight of animals smaller than those desired to be captured, or under the influence of the weight of birds or by the impact of small particles which may be dropped or blown thereon. However, under the influence of an animal of proper weight the trigger 5 will be readily depressed or operated to effect substantially instantaneous release of the jaws 1 with the resultant capture of the animal.

The hood or covering 10 is an important factor of my device as it provides effective means to prevent clods of earth, stones or the like from gaining a position below the pan 6 which would otherwise interfere with the desired operation of the trigger. It is also to be stated at this time that the hood or covering 10 is adapted to be colored to closely simulate the color of the soil, snow or other material in which or upon which it may be placed so as to eliminate suspicion on the part of an approaching animal.

When my trap setting device is in applied position the trigger is received within the notch or recess 9 provided in the upper convolution or fake 7 of the spring S thereby assuring an effective placement of my device yet at the same time assuring the device being maintained in desired effective position.

From the foregoing description it is thought to be obvious that a trap setting device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a trap setting device comprising a coiled spring for placement below the trigger of a trap and for contact with said trigger to hold the same against accidental movement, a convolution of the spring having means coacting with the trigger to maintain the device in applied position.

2. As a new article of manufacture, a trap setting device comprising a coiled spring for placement below the trigger of a trap and for contact with said trigger to hold the same against accidental movement, a convolution of the spring having a notch to receive a portion of the trigger to maintain the device in applied position.

3. As a new article of manufacture, a trap setting device comprising a coiled spring for placement below the trigger of a trap and for contact with said trigger to hold the same against accidental movement, a convolution of the spring being downwardly crimped to provide a notch to receive a portion of the trigger to maintain the device in applied position, and a flexible hood covering said spring.

In testimony whereof I hereunto affix my signature.

FRANK C. MILLS.